(12) United States Patent
Shah et al.

(10) Patent No.: US 7,017,827 B2
(45) Date of Patent: Mar. 28, 2006

(54) METHOD AND SYSTEM FOR AUTOMATICALLY OPTIMIZING ZONE DUCT DAMPER POSITIONS

(75) Inventors: Rajendra K. Shah, Indianapolis, IN (US); William F. VanOstrand, Indianapolis, IN (US); Laurie L. Werbowsky, Jamesville, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/889,735

(22) Filed: Jul. 13, 2004

(65) Prior Publication Data

US 2005/0156050 A1    Jul. 21, 2005

Related U.S. Application Data

(60) Provisional application No. 60/537,717, filed on Jan. 20, 2004.

(51) Int. Cl.
*F24F 7/00* (2006.01)
*G05B 13/02* (2006.01)

(52) U.S. Cl. .................. 236/1 B; 62/298; 165/217; 700/277

(58) Field of Classification Search ............... 236/49.3, 236/78 D, 1 B; 62/177, 179, 180, 298; 165/205, 165/209, 217; 700/276, 277, 278
See application file for complete search history.

(56) References Cited

U.S. PATENT DOCUMENTS

| | | | | |
|---|---|---|---|---|
| 4,549,601 A | * | 10/1985 | Wellman et al. | 165/205 |
| 4,795,088 A | * | 1/1989 | Kobayashi et al. | 236/49.3 |
| 5,004,149 A | * | 4/1991 | Narikiyo et al. | 236/49.3 |
| 5,071,065 A | * | 12/1991 | Aalto et al. | 236/49.3 |
| 5,579,993 A | * | 12/1996 | Ahmed et al. | 236/49.3 |
| 6,732,540 B1 | * | 5/2004 | Sugihara et al. | 62/177 |

* cited by examiner

*Primary Examiner*—Harry B. Tanner
(74) *Attorney, Agent, or Firm*—Carlson, Gaskey & Olds (57) ABSTRACT

A control is functional to perform a method of determining a maximum desired airflow for each of a plurality of zones in a multi-zone HVAC system, and an expected airflow to those zones. In part, these determinations are based upon an algorithm that calculates the relative size of the ducts leading to each of the zones. The expected and maximum airflows are compared for each of the zones, and if any zone has an expected airflow that exceeds its maximum airflow, certain steps are taken to reduce airflow to that zone.

28 Claims, 5 Drawing Sheets

DUCT ASSESSMENT

MEASURES DUCT
CAPACITY FOR EACH
ZONE

5 MINUTES ARE
REQUIRED TO
COMPLETE

PRESS START TO BEGIN

<BACK                    START>

---

DUCT ASSESSMENT

ASSESSMENT ACTIVE

PLEASE WAIT

"STATUS MESSAGE"

<BACK

---

DUCT ASSESSMENT

| ZONE | CAPACITY |
|---|---|
| 1 | 16% |
| 2 | 13% |
| 3 | 8% |
| 4 | 14% |
| 5 | 15% |
| 6 | 11% |
| 7 | 10% |
| 8 | 7% |
| DAMPER LEAKAGE | 6% |

<BACK

METHOD AND SYSTEM FOR AUTOMATICALLY OPTIMIZING ZONE DUCT DAMPER POSITIONS

This application claims priority to provisional patent application Ser. No. 60/537,717, filed Jan. 20, 2004 and entitled "Method and System for Automatically Optimizing Zone Duct Damper Positions." The disclosure of this provisional application is incorporated herein in its entirety, by reference.

BACKGROUND OF THE INVENTION

This application relates to a method and system for adjusting the position of the zone dampers in a multi-zone heating, ventilating and air conditioning (HVAC) system to ensure that unduly high levels of air do not flow into any of the zones.

Multi-zone HVAC systems are known, and include a component(s) for changing the temperature and condition of air (a furnace, air conditioner, heat pump, etc.). For simplicity, these components will be referred to collectively as a temperature changing component. Also, an indoor air handler drives air from the temperature changing component through supply ducts to several zones within a building. Each of the supply ducts typically has dampers that may be controlled to restrict or allow flow of air into each zone to achieve a desired temperature.

The air handler is delivering a fixed amount of air under most operational conditions, and that air is divided between the several zones based upon the damper position, and the size of each duct relative to the other ducts. As one of the dampers is closed, additional air will be driven through the other supply ducts having an open damper. At times, this may cause the amount of air flowing into any one zone to become higher than would be desirable. The damper positions are selected to achieve a desired temperature in that zone, and if additional air is driven through the supply duct into a zone, typically, that zone may become over-conditioned.

In addition, as the amount of air flowing into any one zone increases, the noise level in that zone also increases. At times, this noise level may become undesirably high.

Typically, the prior art has included a pressure responsive bypass for allowing excess air to be returned to the supply or return duct and back to the temperature changing component. This bypass puts an upper limit on the amount of air that may flow into any zone. This solution, however, requires the expense and installation of a bypass valve. Further, by returning already conditioned air to the return duct, the air reaching the temperature changing component is not at the temperature which would be expected from ambient air. As such, additional problems can arise.

SUMMARY OF THE INVENTION

In a disclosed embodiment of this invention, a control performs a method of estimating a maximum airflow for each zone, and an expected airflow for all zones. The two are compared, and should any one zone have an expected airflow that exceeds its maximum desired airflow, then certain steps are taken to minimize actual airflow into that zone.

In one embodiment, the control asks whether the total system airflow could be reduced, and does so if this is possible. Further, the system asks whether unoccupied zone set points can be adjusted to receive more air. It is likely that the unoccupied zones are less sensitive to changes in temperature or additional noise than an occupied zone. If an unoccupied zone set point can be changed, then it is. If further change is still required, then the system asks the same question for occupied zones.

Finally, the system asks whether the temperature changing component can be changed to some other stage, and does so if possible.

To calculate the maximum airflow and the expected airflow for each zone, the system relies upon a unique algorithm for calculating the relative zone duct sizes for each of the zones.

These and other features of the present invention can be best understood from the following specification and drawings, the following of which is a brief description.

DETAILED DESCRIPTION OF THE PREFERRED EMBODIMENT

Figure 1:
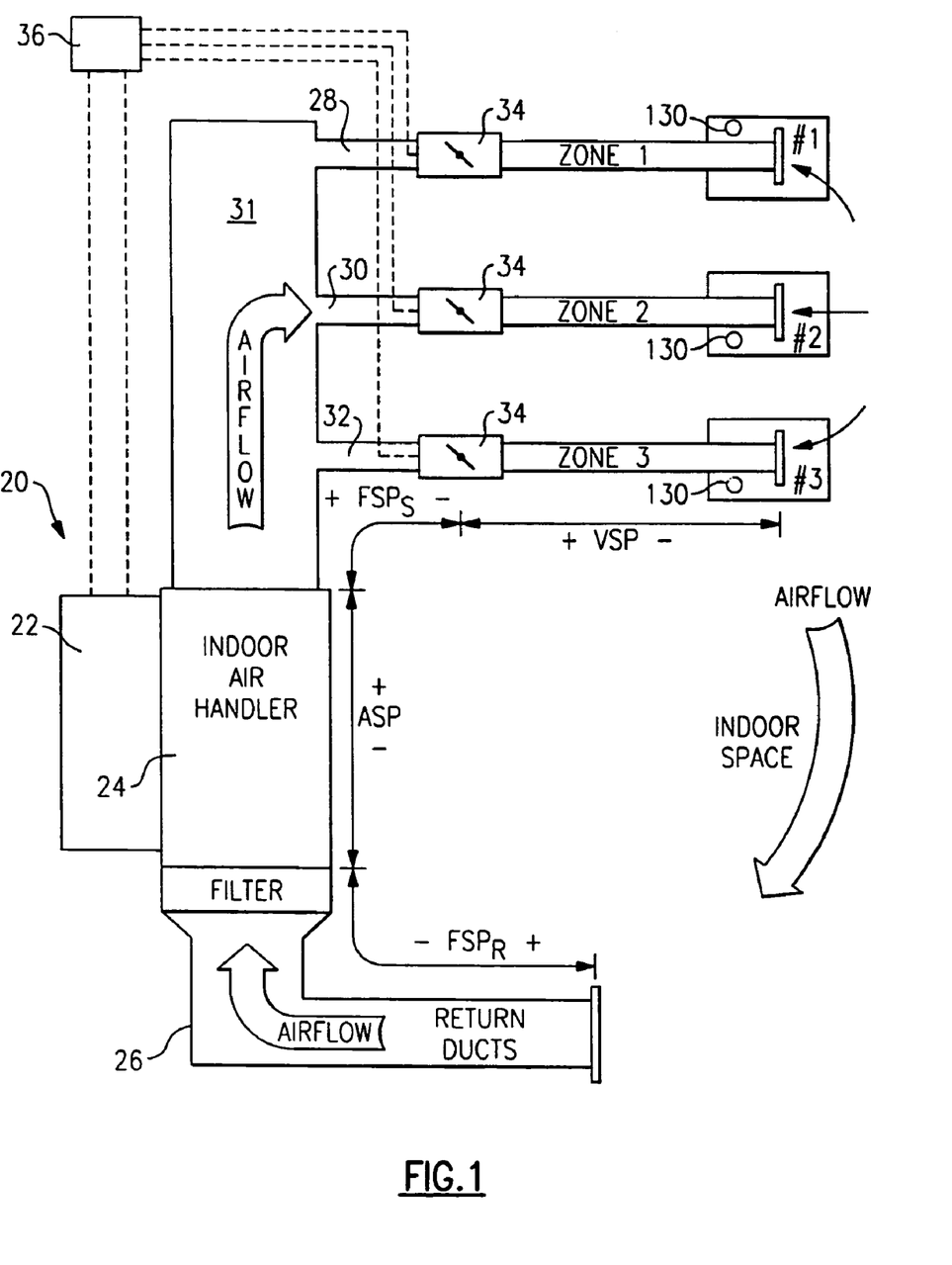
FIG. 1 is a schematic view of a building HVAC system.

A multi-zone HVAC system is shown schematically at 20 in FIG. 1. A temperature changing component 22 for changing the condition of air, e.g., an indoor unit (furnace/heater coil) and/or an outdoor unit (air conditioning/heat pump), is associated with an indoor air handler 24. Air handler 24 takes air from return ducts 26 and drives the air into a plenum 31, and a plurality of supply ducts 28, 30, and 32 associated with distinct zones 1, 2, and 3 in a building. As shown, a damper 34 is provided on each of the supply ducts 28, 30 and 32. A control, such as a microprocessor control 36 controls the dampers 34, temperature changing component 22, indoor air handler 24, and also communicates with controls 130 associated with each of the zones. The controls 130 can essentially be thermostats allowing a user to set desired temperature, noise levels, etc. for each of the zones relative to the others. Moreover, the controls 130 preferably include a temperature sensor for providing an actual temperature back to the control 36.

In one embodiment, the control 36 is mounted within one of the thermostat controls 130, and communicates as a system control with all of the other elements through control wiring schemes such as is disclosed in co-pending U.S. patent application Ser. No. 10/752,626, entitled "Serial Communicating HVAC System" and filed on Jan. 7, 2004. As disclosed, control 36 is able to receive configuring information with regard to each of these system components so that control 36 understands individual characteristics of the elements 22, 24, 30 and 34. Details of this feature may be as disclosed in co-pending U.S. patent application Ser. No. 10/752,628, filed on Jan. 7, 2004 and entitled "Self-Configuring Controls for Heating, Ventilating and Air Conditioning Systems." The disclosure of each of these applications is incorporated herein by reference.

In the prior art, the amount of air driven by the air handler 24 to each of the zones 1, 2 and 3 sometimes become excessive. Dampers 34 may be opened or closed to restrict or allow additional airflow into the zones 1, 2 and 3. While there are dampers that are driven to either be full open or full closed, the present invention is disclosed as used with a damper having not only full open and full closed positions, but also several incrementally closed positions. In one example, there are 16 incremental positions for the damper between full open and full closed. As any one of the dampers 34 is closed to reduce conditioning in that zone, additional airflow is driven to the more open of the dampers. This may sometimes result in too much air being delivered to one of the zones, which can cause excessive temperature change, and undue noise. In the prior art, pressure responsive bypass valves may be associated with the ducting 28, 30, 32 or upstream in plenum 31. The bypass of the air has undesirable characteristics, as it requires additional valves, ducting, etc., and thus complicates assembly. Typically, the bypass air is returned to the temperature changing component 22 through return duct 26. Thus, the air approaching temperature changing component 22 has already been changed away from ambient, and may be too cold or too hot for efficient operation.

For this reason, it would be desirable to find an alternative way of ensuring undue volumes of air do not flow through any of the ducts 28, 30, and 32 into the zones 1, 2, and 3. Of course, in many systems, there may be more or less than three zones. However, for purposes of understanding this invention, three zones will suffice.

Figure 2:
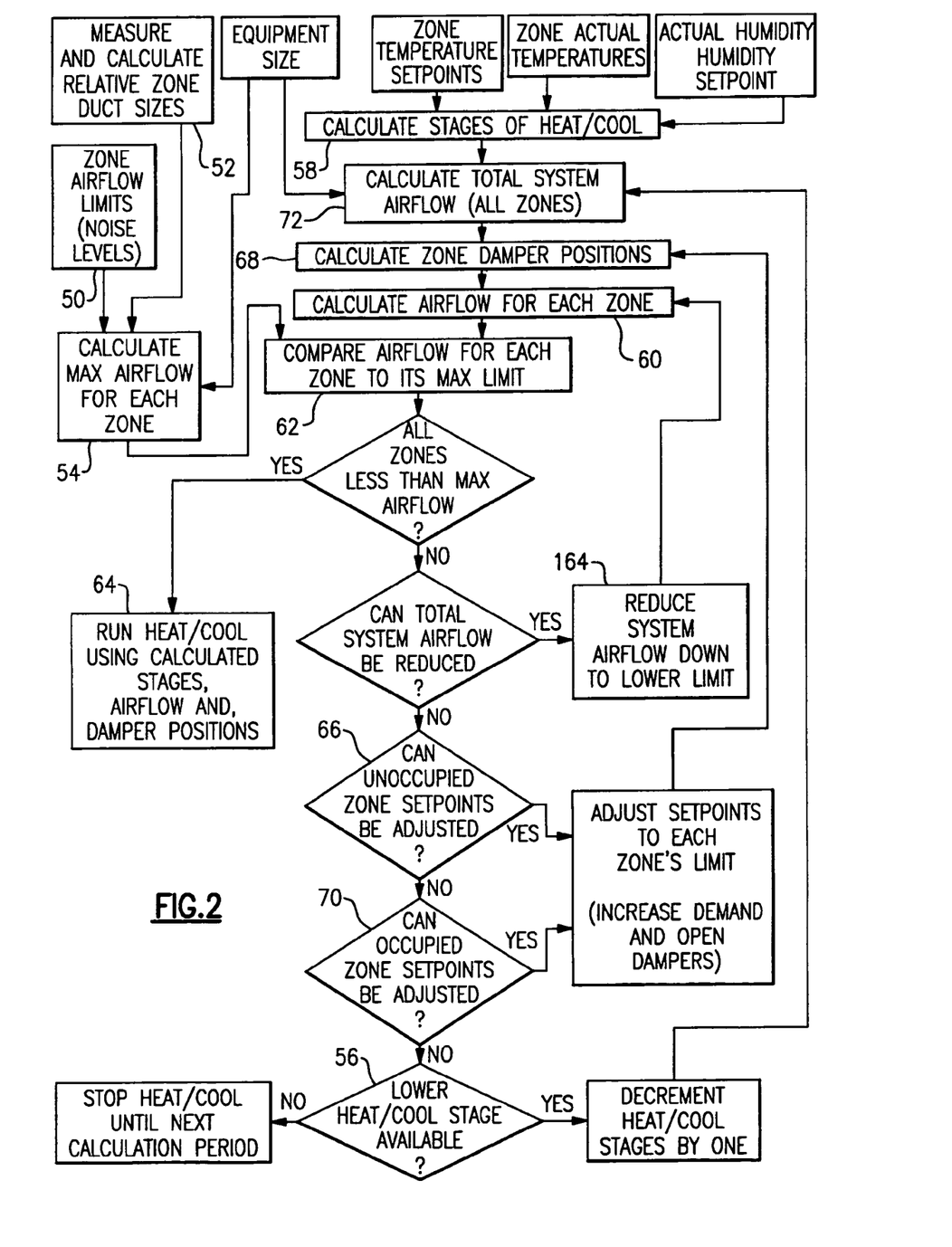
FIG. 2 is a flowchart of the inventive method.

A flowchart of a control for the dampers to eliminate the need for bypass is illustrated in FIG. 2. At step 50, a zone airflow limit is set for each of the zones 1, 2, and 3. The controls 130 may be provided with input settings allowing these limits to be set. For example, the controls 130 may be provided with settings allowing the maximum airflow limit to be LOW, NORMAL, HIGH or MAXIMUM. These settings increase the weighting of allowing additional conditioned air into the zone at the expected cost of potential additional noise as the airflow increases. Thus, a user most concerned about reducing noise might set the control to the LOW level. Also, some factory set default is included. In simpler designs, it may well be that only the default is utilized, and no operator override of this default value is provided.

The invention includes an automatic duct size assessment step 52 orchestrated by control 36, performed shortly after installation of the system in a home, and repeated periodically thereafter. This size duct assessment process consists of a measurement process and a computational process.

Figure 3:
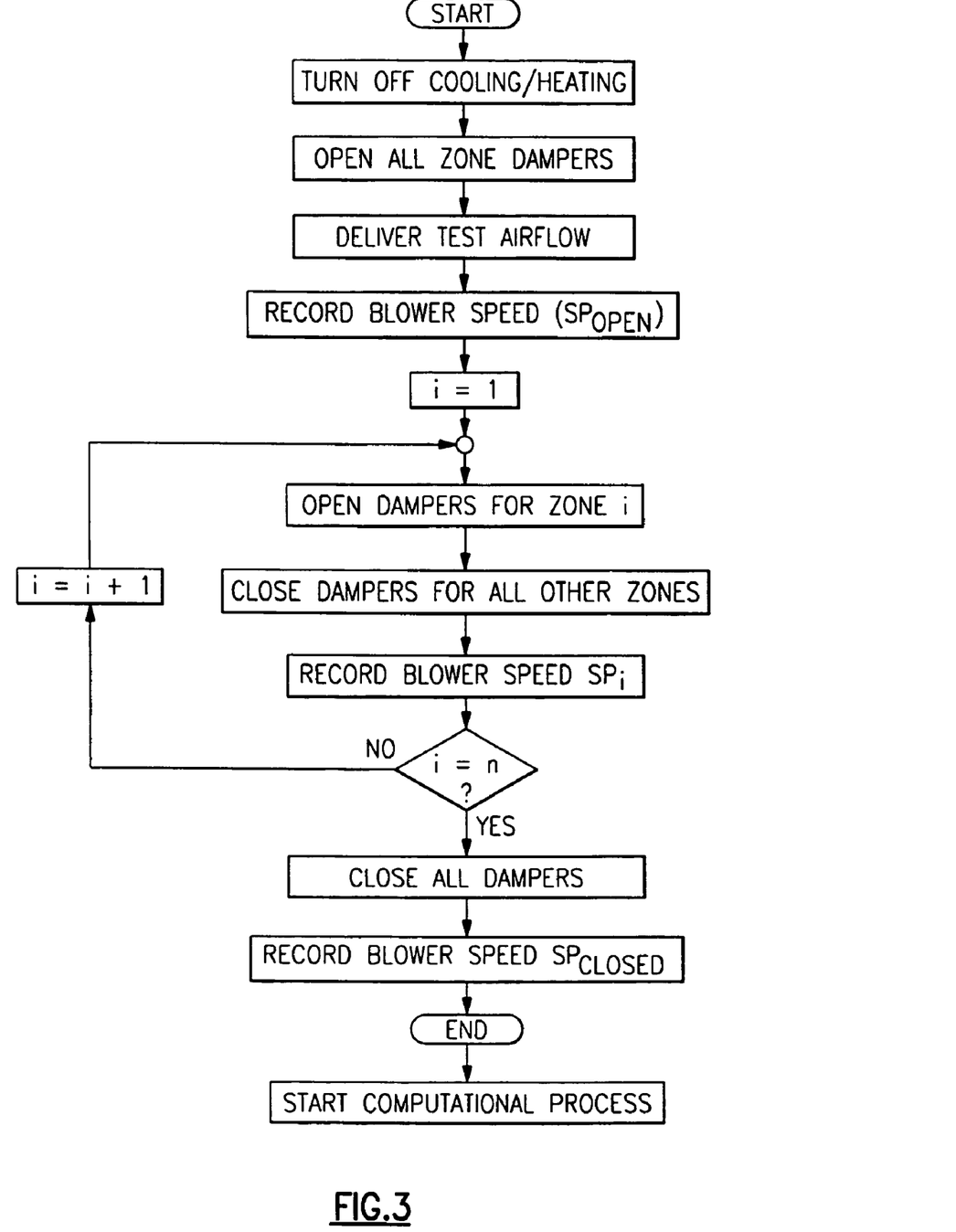
FIG. 3 is a flowchart of one portion of the invention.

In the initial measurement process, the control 36 temporarily turns off temperature changing component 22. This process is generally shown in FIG. 3. Control 36 commands the dampers 34 of all zones to fully open. Control 36 then commands the system air handler 24 to deliver a predetermined fraction of the maximum system airflow (test airflow) into plenum 31 and ducts 28, 30, 32. The air handler 24 determines the speed of its blower motor and communicates this information to control 36, which stores it in a memory. Next, control 36 closes all dampers 34 except for a first zone's. Air handler 24 is still asked to deliver the same test airflow as before, and it reports the new blower motor speed to control 36. The relative blower speeds are indicative of the relative restriction in the ducts, as explained below. In this manner, sequentially, dampers 34 for each zone in the system are opened while all other zone dampers 34 are closed. In each step of this sequence, the same airflow is delivered by air handler 34, and the resulting blower speed is recorded. Finally, all zone dampers 34 are closed and the same test airflow is forced through any leaks in the dampers 34 or in the ducts 28, 30, 32, 34 around them. Again, the blower speed is recorded. Thus, for a system with n zones, a total of n+2 blower speed measurements (SP) are taken;

SPopen for all zones open;
SPclosed for all zones closed; and
SPi for each zone open by itself.

It should be noted that in the above measurement process, instead of fully opening and closing the dampers, they may be partially opened at two different positions. Also, different test airflow levels may be used in different steps of the sequence. These variations, if chosen, can be accommodated by adjusting the computational process shown below. A worker in this art would understand how to adjust the computation to achieve the desired results.

The speed measurements are converted to duct static pressure measurements as shown below. This embodiment has some benefits, as it is sensorless. An alternative is to substitute direct duct pressure measurement instead of the speed measurement using an economical and reliable pressure transducer.

Figure 4:
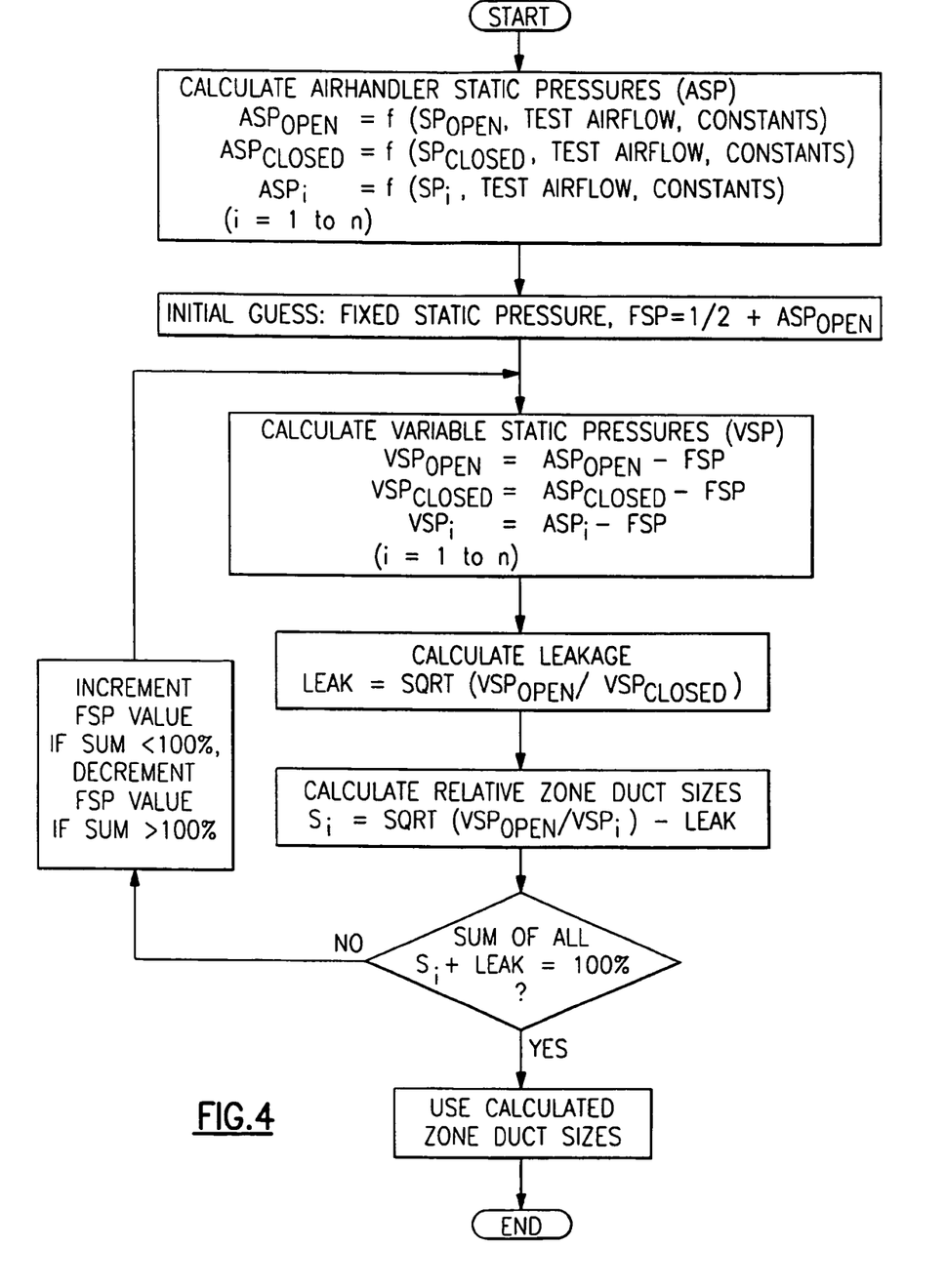
FIG. 4 is a flowchart of a step subsequent to the FIG. 3 flowchart.

A computational process to determine duct size is shown in FIG. 4. Initially, a series of air handler static pressures (ASP) are determined based upon the blower speeds. An algorithm for determining these static pressures is disclosed in co-pending U.S. patent application Ser. No. 10/426,463, filed Apr. 30, 2003 and entitled "Method of Determining Static Pressure in a Ducted Air Delivery System Using a Variable Speed Motor." The entire disclosure of this application is incorporated herein by reference, and in particular, the algorithm to determine static pressures across a system is incorporated. The algorithm relates the static pressure developed across air handler unit 24 (from its inlet to its outlet) to 1) the airflow delivered by it, 2) the speed of its blower motor and 3) predetermined constants depending on the physical characteristics of the air handler.

As mentioned above, the control 36 receives initial configuration information on all of the responsive components in system 20. During this self-configuration, and perhaps during installation of the system, the air handler unit 24 communicates with control 36 and provides its characteristic constants. The system control uses the formula in the above application, including unit characteristic constants of air handler unit 24, a commanded airflow and a measured blower speed to compute the static pressure across the air handler unit. As shown in FIG. 4, these calculations (based upon the blower speeds) are repeated with all dampers 34 open and closed, and then each one with only one open. This results in n+2 computed values of ASP, one for each measurement. These are labeled ASPopen, ASPclosed, ASP1, ASP2 . . . ASPn. In an alternate implementation, a control at air handler unit 24 itself can do the same computation and communicate the computed static pressures to control 36.

Another principle utilized in the computation is the well-known "square law," that relates the static pressure across any duct segment or passive equipment unit to the airflow through it. The law states that the static pressure varies as the square of the airflow. This law, while a simplification of the more complex relationships between the variables, has been proven to be generally valid at the air velocities used in residential systems.

The ASP values are utilized to calculate fixed static pressure (FSP) values. As seen in FIG. 1, the static pressure developed across air handler unit 24 is dropped across any external equipment units that the airflow passes through (such as filters and external air conditioning coils) and the entire duct system, both supply side 28, 30, 31, 32 and return side 26. Each zone's dampers 34 control the segment of the supply duct that delivers air to the zone. In this disclosed system, there are no dampers in return ducts 26. Therefore, the return ducts, the external equipment units and the supply ducts prior to the dampers constitute the "fixed" part of the system, through which the full system air is always flowing. This means that, for the same system airflow, the combined pressure drop across these elements, the Fixed Static Pressure (FSP), is the same, regardless of damper positions. Thus, the FSP is the same for all n+2 measurements. This FSP is itself an unknown to be determined by the computation process.

A quality known as variable static pressure (VSP) is a static pressure across the supply duct segments, across and downstream of dampers 34. The VSP values vary as the measurement process directs the same system airflow through duct segments of differing relative size for each zone. Since pressures need to equalize over the complete loop (air handler, supply side, indoor space, return side), for each measurement step:

$$ASP = FSP + VSP$$

The VSP in any measurement step is indicative of the size of the duct segments that are open. The more restrictive a duct segment is (smaller size), the higher will be the static pressure (VSP) across it for the same system airflow. Thus, the duct segment size is inversely related to the VSP. Duct segment size is conveniently computed in terms of airflow capacity, so as to easily determine its fair share of the entire system airflow. For this reason, utilizing the square law relationship between airflow and pressure mentioned above, duct segment size is inversely proportional to the square root of the VSP. The present need is to determine the relative size of a duct segment, each zone's duct size is computed as a fraction (or percentage) of the entire supply duct system (all zones). Thus, the relative duct size for zone i, labeled SLi is computed as:

$$SLi = SQRT(VSPopen/VSPi)$$

To increase accuracy, the inventive system identifies system leakage. Even with all dampers 34 closed, air can still flow. This is because the dampers 34 are not perfect and some air may leak through. Also, the ducts 31, 28, 30, 32 may also have leaks. In some homes, this leakage can be significant. That is why a last measurement with all dampers closed is taken. The "relative size" leakage can be computed exactly as above:

$$LEAK = SQRT(VSPopen/VSPclosed)$$

Since the leakage effectively adds to the apparent size of each zone's duct segments, it needs to be subtracted out. Thus, the corrected zone duct sizes are:

$$Si = SLi - LEAK$$

The above computation used the ASP values. However, to compute the corresponding VSP values one must determine the FSP value and then use the equation:

$$ASP = FSP + VSP$$

Figure 5:
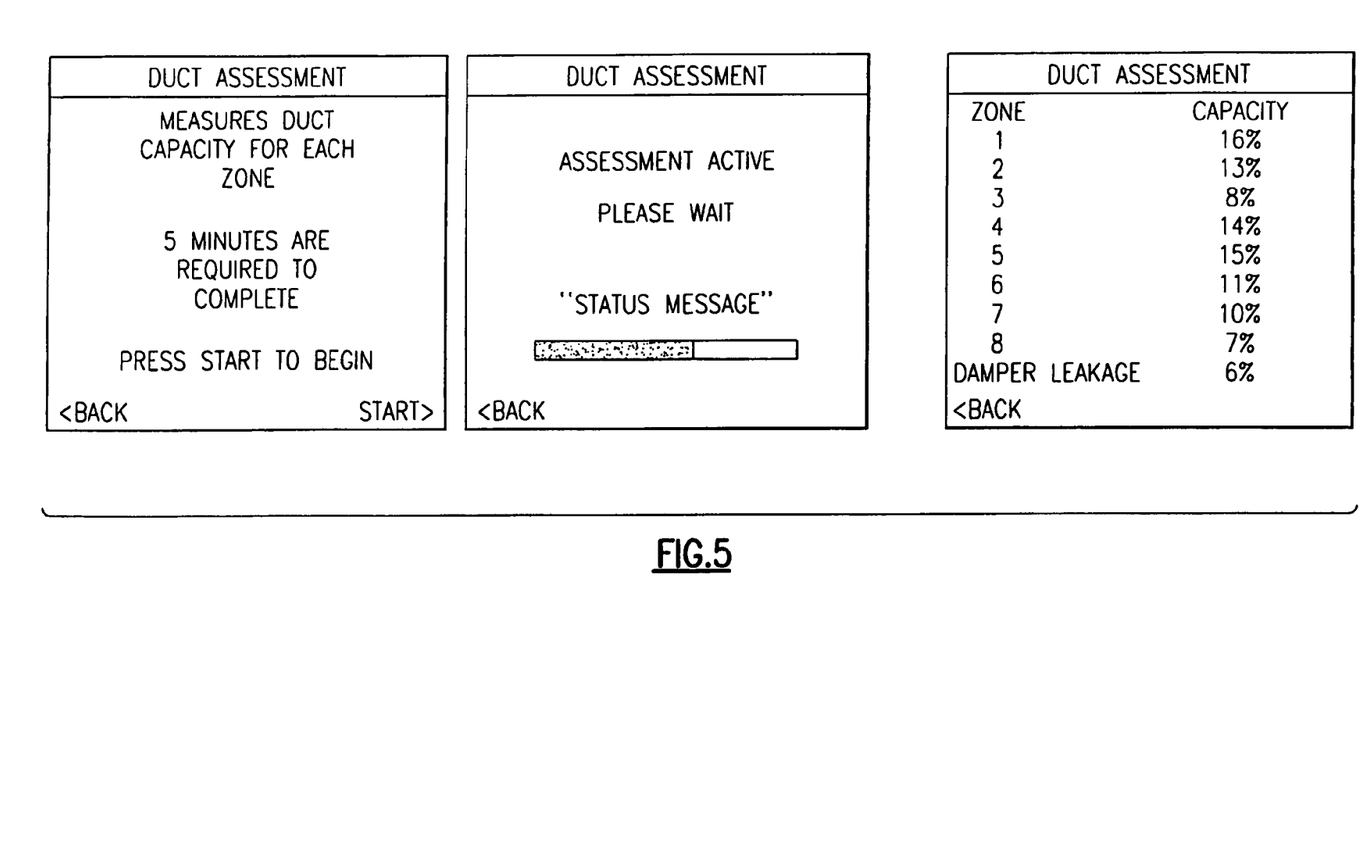
FIG. 5 shows exemplary displays at a control.

Modeling the full duct system and applying the square law and other relationships results in a very complex mathematical model and the need to solve multiple non-linear algebraic equations. Instead, an aspect of this invention is to start with an "initial guess" for the value of the FSP. Then from the already computed ASP values, the corresponding VSP values can be computed. Then, with the above equations, the relative sizes for each zone and the leakage size can be computed. Since all these sizes are percentages of the fully open duct system, these percentages must add up to 100%. Using a computer iterative routine as shown in FIG. 4, the value of FSP is repeatedly adjusted until all zone sizes plus the leakage size add up to 100%. At that point, the correct values of FSP and all the zone relative sizes are determined. FIG. 5 shows the display screens on control 36 during the duct size assessment process and results displayed at the end of the process.

At this point, step 52 is complete and control 36 has calculated the relative zone duct sizes for the zone ducts 28, 30, and 32. Once this computation of the relative zone duct sizes has been complete, it should be relatively reliable for the life of the system. Even so, it may be repeated periodically.

In addition, while the above-referenced inventive way of determining the air handler static pressures (i.e., the algorithm disclosed in the above-referenced co-pending patent application) other known methods to determine the static pressure, such as manually taking pressure measurements with pressure gauges, etc., may also be utilized within the scope of this invention.

Returning to FIG. 2, at step 54, these size quantities, along with information on the size and capacity of the temperature changing component 22, and the setting (step 50) are utilized to calculate a maximum airflow value for each of the zones (1, 2, 3).

The computation of maximum airflow for each zone is completed by the following analysis. A highest system airflow value is determined by assuming that the duct system for the whole house (all zone dampers fully open) is designed to accommodate the highest system airflow required to operate the temperature changing component 22 that is installed in the home. Control 36, through the self-configuration process, knows capacities and airflow requirements of temperature changing component 22 (the installed furnace, air conditioner or heat pump). From this, control 36 computes a highest system airflow (HAS). In one embodiment:

$$HAS = \text{the higher of } x(CFM/TON)*(\text{The Capacity in Tons}) \text{ or } y*\text{High Furnace Airflow.}$$

"CFM" or cubic feet per minute is the unit measure for airflow. The capacity of air conditioners and heat pumps is typically measured in TONs. In one embodiment, x=450 and y=1.12. Of course, different numeric factors for x and y may be used in this computation.

A highest zone airflow is then determined. With all dampers fully open, each zone gets a share of the total system airflow depending on the "relative size" of the duct segments delivering air to that zone. "Relative size" of a duct segment is a measure of its ability to allow more or less air to flow through it at a certain system pressure. Thus, a zone with a larger duct size will get a higher share of the system airflow than a zone with a smaller duct size. Control 36 has determined the relative duct sizes for all zones in the system. These relative sizes may be expressed as a percentage of the whole duct system and labeled S1, S2, S3 . . . Sn, where n is the number of zones in the system. Then, for each zone, the Highest Zone Airflow (HZAi) is computed as:

$$HZAi = Si*HAS \text{ for } i=1 \text{ to } n.$$

It should be noted that HZAi is the highest expected airflow in each zone with all zone dampers fully open, as if the system was not zoned.

A MAX Zone airflow limit is then determined. In a zoned system, as dampers 34 open and close to redistribute air among the different zones to match their changing heating or cooling needs, any particular zone can, at times get more than its "fair share" of the system airflow. This enables the zone system to deliver a higher level of comfort to occupants of the zone. However, as the airflow increases, at some point, the air noise in the zone may be unacceptable. There is, therefore, a need for a MAX airflow limit for each zone. To some degree, this balance between comfort and noise is a subjective decision depending on the preferences of the occupants. However, to minimize the need for installer or homeowner adjustments and to make the system set-up easy and consistent, control 36 "scales" the MAX zone airflow (MZA) limit to the highest zone airflow computed above. In one embodiment, a user (occupant or installer) can select one out of four Airflow Limits for each zone: LOW, NORMAL, HIGH and MAXIMUM. This is provided as an option at control 130 and/or 36. In one embodiment, the MAX Zone Airflow limits are computed as:

| Selection | MZAi |
|---|---|
| LOW | HZAi |
| NORMAL | 1.5*HZAi (This may be the Factory Default) |
| HIGH | 2*HZAi |
| MAXIMUM | 2*HZAi |

The MAXIMUM selection has the same airflow limit as HIGH, and is used to reduce system airflow and adjust set points if possible as explained below. However, if adjustment is not possible, with the MAXIMUM setting, the heating or cooling stages (step 56, explained below) are never reduced. Comfort in a zone with MAXIMUM airflow limit is achieved even if noise may be unacceptable.

As mentioned, each of the zones (1, 2, 3) allows an operator to set a desired temperature set point at control 130. Further, the control 130 provides the actual temperature at each of the zones, along with an actual humidity, and a humidity set point if the system is so sophisticated. At step 58, control 36 calculates a desired stage of heating/cooling. One way of calculating the desired stage of heating or cooling is disclosed in U.S. patent application Ser. No. 10/760,664, filed on Jan. 20, 2004 and entitled "Control of Multi-Zone and Multi-Stage HVAC System." Based upon the equipment size and the stage of heating/cooling, some total system airflow will then be known or can be calculated by control 36. Control 36 is also able to calculate a desired damper position for each of the zones to meet the desired temperature set point in the zone, and in consideration of the actual temperature in each of the zones at that time. The algorithm to perform these computations are as disclosed in U.S. Pat. No. 5,829,674.

Then, at step 60, control 36 calculates expected airflow for each zone, by considering the total system airflow, the damper position in each zone and the relative zone duct sizes. The dampers 34 are modulating in that its rotating blade can be controlled to any angular position between open and closed. As mentioned above, in one embodiment, the dampers are controlled to 16 positions, labeled 0 through 15 with 0 being fully closed and 15 being fully open; each position in between is achieved by a step of equal angular movement. The embodiment also assumes a linear relationship between the dampers angular position and its "openness" or relative ability to allow airflow.

With the linear relationship, the relative airflow capability D for each damper position is computed as:

$D=j/15$ for position $j; j=0$ to 15.

Thus for position 15 (fully open), the relative airflow capability is 100% while for position 0 (fully closed) it is 0.

The relationship may also non-linear and laboratory tests may be used to determine this relationship for a particular style of damper, and then used in the following computation.

Control 36 uses relative duct sizes for each zone in the system, labeled S1 through Sn for a system with n zones here again. Control 36 modulates the zone dampers 34 to deliver more or less air to each zone in response to each zone's comfort demand. The control 36 determines the desired damper position and the corresponding damper airflow capability for each zone. These are labeled D1 through Dn. Control 36 also knows the total system airflow As that needs to flow through the entire system. From these values, control 36 computes the fraction of airflow, Ai being delivered to each zone:

$Ai=As*(Di*Si)/(SUM(Di*Si)$ for $i=1$ to $n))$

At step 62, control 36 compares the expected airflow for each zone to its maximum limits. If all of the calculated expected zone airflows are less than the maximum airflows for the respective zones, then control 36 goes to step 64, and simply operates the HVAC system.

However, if an expected zone airflow exceeds its maximum airflow, then control 36 asks whether the total system airflow can be reduced. This is generally a function of the design of the temperature changing component, and the air handler. If the total system airflow can be reduced, then it is incrementally reduced toward a lower limit at step 164, and control returns to step 60 to recalculate the actual airflow for each zone and move back to step 62.

However, if the total system airflow cannot be reduced, or has been reduced to its lower limit, then control 36 moves to step 66, where it considers the availability of set point adjustment for an unoccupied zone. The controls 130 may allow an operator to set whether a zone is unoccupied. For example, rooms that are only used during certain periods of the year may be kept at a less conditioned temperature to reduce the cost of operating the HVAC system 20. If such a room is set as an unoccupied zone in the system 20, then, as part of step 66, control 36 considers providing additional conditioning at that zone.

Normally, the set points for unoccupied zones are set to a minimum temperature for heating (such as 60 degrees) or a maximum temperature for cooling (such as 85 degrees). With these set points, these zones rarely need any cooling or heating and their dampers remain closed. This saves energy and also allows more of the airflow (and capacity) to be delivered to the occupied zones, as needed to achieve their comfort set points. However, if the expected airflow being delivered to an occupied zone exceeds its max airflow limit, the inventive control 36 can open up the dampers of any unoccupied zones so they can absorb some of the airflow. This enables the occupied zone to be comfort conditioned while staying within its desired noise maximum airflow limit. The control 36 accomplishes this by raising the unoccupied zone heating set point or lowering the cooling set point until the demand in the unoccupied zone causes its damper to open. In the disclosed embodiment, a limit is applied to this set point adjustment. The heating set point is not adjusted above the highest heating set point in any (occupied) zone, while the cooling set point is not adjusted below the lowest cooling set point in any zone. In general, dampers 34 in unoccupied zones may also simply be directly opened without adjusting their set points and their temperature may be allowed to be conditioned to any predetermined limit.

Again, if the unoccupied zone set points can be adjusted, this is done, and the system returns to step 68 where the zone damper conditions can be recalculated, and then to steps 60 and 62. If the unoccupied zone set points cannot be adjusted (initially, or anymore), then the system then moves to step 70, where the occupied zone set points are considered for adjustment.

In the disclosed embodiment, if a zone needing heating or cooling is above its maximum airflow limit and all unoccupied zones have been opened to their limits, the control adjusts the set points of other occupied zones in a manner similar to the unoccupied zones in order to direct more airflow to those zones. In one embodiment, the adjustment limit for an occupied heating set point is set no higher than three degrees below the highest heating set point in any zone. Similarly, the adjustment limit for an occupied cooling set point is set no lower than the three degrees above the lowest cooling set point. Again, different limits may be chosen.

If control 36 can adjust an occupied zone set point, this is done. The control 36 then returns to step 68, then steps 60 and 62. However, if this cannot be done, then the system moves to step 56, and considers whether a lower heating or cooling stage is available. If one is available, the system moves into that lower stage, and returns to step 72 to recalculate the total system airflow, and then to steps 68, 60, 62, etc. As mentioned above, if a zone has been set at a MAXIMUM setting, and it is this zone that might be receiving airflow exceeding its maximum airflow, step 56 may not be run.

If no lower stage is available, then heating and cooling may be stopped until the next calculation period. The above calculations are performed on a periodic basis.

Embodiments of this invention have been disclosed. A worker of ordinary skill in the art would recognize that certain modifications would come within the scope of this invention. For that reason, the following claims should be studied to determine the true scope and content of this invention.

What is claimed is:

1. An HVAC system including:
   a temperature changing component to change the temperature of air;
   ducts to supply air to a plurality of zones and a damper associated with said ducts leading to each of the zones;
   controls for providing temperature set points and actual temperatures in the plurality of zones;
   a system control determining information relative to the plurality of zones; and
   said control calculating an expected airflow for each of the plurality of zones based upon said information, said control also storing a maximum airflow desired for at least some of said plurality of zones, and said control comparing said expected and said maximum airflows for said some of said plurality of zones and taking corrective action should an expected airflow exceed said maximum airflow of said some of said plurality of zones.

2. The HVAC system of claim 1, wherein said expected airflow is calculated based in part on a determination of duct sizes for said ducts leading to the plurality of zones.

3. The HVAC system of claim 1, wherein said control also storing a maximum airflow for each of the plurality of zones, and said control comparing said expected and said maximum airflows, and taking corrective action should an expected airflow exceed said maximum airflow for any of the plurality of zones.

4. The HVAC system of claim 2, wherein said maximum airflow is also determined utilizing said duct size for each of the ducts leading to the plurality of zones.

5. The HVAC system of claim 2, wherein airflow limits are set, and considered along with said duct sizes to calculate said maximum airflow.

6. The HVAC system of claim 5, wherein said airflow limits may be set by an operator.

7. The HVAC system of claim 1, wherein said control evaluates available options to reduce airflow to any zone wherein said expected airflow exceeds said maximum airflow.

8. The HVAC system as set forth in claim 7, wherein, as one option, said control considers whether the total airflow through the entire system may be reduced to achieve said reduction of airflow to any zone wherein said expected airflow exceeds said maximum airflow.

9. The HVAC system as set forth in claim 7, wherein, as one option, said control evaluates whether airflow to any of said plurality of zones can be increased to reduce airflow to any zone wherein said expected airflow exceeds said maximum airflow.

10. The HVAC system as set forth in claim 9, wherein said control first considers whether any unoccupied zone airflow can be adjusted to achieve said airflow increase.

11. The HVAC system as set forth in claim 10, wherein said control then considers whether any occupied zones can be adjusted to achieve said airflow increase.

12. An HVAC system including:
   a temperature changing component to change the temperature of air;
   ducts to supply air to a plurality of zones and a damper associated with said ducts leading to each of the zones;
   controls for providing temperature set points and actual temperatures in the plurality of zones;
   a system control determining information relative to duct sizes for said ducts leading to the plurality of zones; and
   said control calculating a maximum airflow for each of the zones based at least in part on said duct sizes.

13. The HVAC system of claim 12, wherein said maximum airflow is calculated in part based on a determination of duct size for said ducts leading to the plurality of zones.

14. A method of operating an HVAC system comprising the steps of:
   (1) providing an HVAC system including a temperature changing component to change the temperature of air, ducts to supply air from said temperature changing component to a plurality of zones, and providing a damper associated with each of said ducts leading to each of the zones, and providing a control for providing temperature set points and actual temperatures in each of the plurality of zones to a system control; and
   (2) operating said HVAC system, and determining an expected airflow volume into each of the zones, and comparing said expected airflow volume to a maximum airflow volume for each of the zones, and taking corrective action should said actual airflow value exceed said maximum airflow value for any of the zones.

15. The method of claim 14, wherein said corrective action includes increasing airflow into another of the zones, should any of the zones have an expected airflow that exceeds said maximum airflow.

16. The method of claim 15, wherein airflow is increased into an unoccupied zone as a first step, if an unoccupied zone can have increased airflow.

17. The method of claim 16, wherein airflow is increased into an occupied zone, should the airflow not be able to be increased into an unoccupied zone.

18. The method of claim 17, wherein a capacity stage of said temperature changing equipment is reduced if airflow cannot be further increased into either an unoccupied zone or an occupied zone.

19. The method of claim 14, wherein said system control reduces total system airflow as said corrective action.

20. An HVAC system controller comprising:
   a control receiving information relative to duct sizes for ducts leading to each of several zones associated with said control;
   said control calculating a maximum airflow for each of the zones based upon said information; and
   said control also calculating an expected airflow for each of the zones, and comparing said expected airflow to said maximum airflow for each of said zones.

21. The control as set forth in claim 20, wherein airflow limits are set, and considered along with the duct sizes to calculate said maximum airflow.

22. The control as set forth in claim 21, wherein said airflow limits may be set by an operator.

23. The control as set forth in claim 20, wherein said control also calculates an expected airflow for each of the zones, and compares said expected airflow to said maximum airflow for each of said zones.

24. The control as set forth in claim 20, wherein said control evaluating available options to reduce airflow to any zone wherein said expected airflow exceeds said maximum airflow.

25. The control as set forth in claim 24, wherein, as one option, said control considers whether the total airflow through that system may be reduce to achieve said reduction.

26. The control as set forth in claim 24, wherein, as one option, said control evaluates whether airflow to any of the zones can be increased to achieve said reduction.

27. The control as set forth in claim 26, wherein said control first considers whether any unoccupied zone set points can be adjusted to achieve said airflow increase.

28. The control as set forth in claim 27, wherein said control then considers whether any occupied zone set points can be adjusted to achieve said airflow increase.

* * * * *